(12) United States Patent
Yazici et al.

(10) Patent No.: US 12,723,544 B1
(45) Date of Patent: Sep. 1, 2026

(54) AIRCRAFT POWERPLANT WITH MULTI-CIRCUIT HEAT EXCHANGER

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/066,307

(22) Filed: Feb. 28, 2025

(51) Int. Cl.

| | |
|---|---|
| ***F02C 7/12*** | (2006.01) |
| ***B64D 27/33*** | (2024.01) |
| ***B64D 31/18*** | (2024.01) |
| ***B64D 33/08*** | (2006.01) |
| ***B64D 35/022*** | (2025.01) |
| ***F01D 15/10*** | (2006.01) |
| ***F02C 6/00*** | (2006.01) |
| ***F02C 7/06*** | (2006.01) |
| *F02K 3/02* | (2006.01) |

(52) U.S. Cl.
CPC ................ *F02C 7/12* (2013.01); *B64D 27/33* (2024.01); *B64D 31/18* (2024.01); *B64D 33/08* (2013.01); *B64D 35/022* (2024.01); *F01D 15/10* (2013.01); *F02C 6/00* (2013.01); *F02C 7/06* (2013.01); *F02K 3/02* (2013.01)

(58) Field of Classification Search
CPC ..... F02C 7/06; F02C 7/12; F02C 6/00; B64D 35/021; B64D 35/022; B64D 33/08; B64D 27/33; B64D 31/16; B64D 31/18; F01D 15/10; F05D 2260/213; F05D 2260/98; F02K 3/02; F02K 3/025; F02K 3/06
See application file for complete search history.

(56) References Cited

U.S. PATENT DOCUMENTS

| | | | | |
|---|---|---|---|---|
| 11,970,973 | B2 | 4/2024 | Long | |
| 12,270,342 | B1 * | 4/2025 | Rambo | F02C 7/14 |
| 12,291,347 | B2 * | 5/2025 | Mark | B64D 27/24 |
| 12,523,177 | B1 * | 1/2026 | Clark | F02C 9/16 |
| 12,560,119 | B1 * | 2/2026 | Clark | F02C 7/141 |
| 12,570,405 | B1 * | 3/2026 | Yazici | B64D 31/18 |
| 2018/0258859 | A1 * | 9/2018 | Suciu | F02K 3/115 |
| 2020/0248620 | A1 * | 8/2020 | Zysman | F02C 7/14 |
| 2020/0300164 | A1 | 9/2020 | Muldoon | |
| 2022/0368197 | A1 * | 11/2022 | Hinderliter | H02K 9/19 |

(Continued)

OTHER PUBLICATIONS

EP Search Report for EP Patent Application No. 26161766.6 dated Jun. 23, 2026.

*Primary Examiner* — William H Rodriguez
(74) *Attorney, Agent, or Firm* — Getz Balich LLC

(57) ABSTRACT

An assembly is provided for an aircraft powerplant. This assembly includes a first powerplant component, a second powerplant component, a third powerplant component and a fluid system. The fluid system includes a first fluid circuit, a second fluid circuit, a third fluid circuit and a heat exchanger. The first fluid circuit extends through the heat exchanger and is configured to service the first powerplant component. The second fluid circuit extends through the heat exchanger and is configured to service the second powerplant component. The third fluid circuit extends through the heat exchanger and is configured to service the third powerplant component. The heat exchanger is configured as or otherwise includes a radiator.

17 Claims, 7 Drawing Sheets

(56) References Cited

U.S. PATENT DOCUMENTS

2023/0117984 A1* 4/2023 Niergarth ................ F02C 7/185
415/177
2023/0138133 A1* 5/2023 Alahyari .................. H02K 9/18
310/54
2023/0192304 A1* 6/2023 Mattikalli ............ B64D 35/025
244/53 R
2023/0332510 A1* 10/2023 Westervelt ................ F02C 9/28
2023/0358255 A1* 11/2023 Yamarthi .............. F25B 31/004
2024/0011417 A1* 1/2024 Sibbach .................. F01D 21/12
2024/0110514 A1* 4/2024 Minelli ..................... F02C 7/16
2024/0175390 A1* 5/2024 Rodriguez Erdmenger ................
F02C 7/14
2024/0190574 A1 6/2024 Ostdiek
2024/0208664 A1* 6/2024 Menheere ................. F02C 7/36
2024/0271547 A1* 8/2024 Syed .................... B64D 35/025
2024/0287933 A1* 8/2024 Gallagher ................. F02C 7/32
2024/0425187 A1* 12/2024 Gharagozloo ......... B64D 31/10
2025/0101919 A1* 3/2025 Niergarth ................ F01D 25/12
2025/0136288 A1* 5/2025 Pirnar ................. B64C 29/0033
2025/0171153 A1* 5/2025 Ostdiek .................. B64D 27/24
2025/0198342 A1* 6/2025 Molesini ................... F02K 3/02
2025/0305454 A1* 10/2025 Miller ....................... F02K 3/06
2025/0326491 A1* 10/2025 Clark ..................... B64D 27/33
2025/0326492 A1* 10/2025 Clark ...................... F01D 15/10
2025/0334357 A1* 10/2025 Fish .......................... F02C 7/14

* cited by examiner 30,88
90
177
154
54
142A
142B
142C
170
32
20,22

28,82
30
90
88
84
154
168
142A
142B
142C
176
170
54
20,22

AIRCRAFT POWERPLANT WITH MULTI-CIRCUIT HEAT EXCHANGER

BACKGROUND OF THE DISCLOSURE

1. Technical Field

This disclosure relates generally to an aircraft and, more particularly, to a working fluid system for a powerplant of the aircraft.

2. Background Information

An aircraft powerplant includes various components which utilize fluid cooling and/or lubrication during aircraft powerplant operation. Various fluid cooling and/or lubrication systems and methods are known in the art. While these known cooling and/or lubrication systems and methods have various benefits, there is still room in the art for improvement.

SUMMARY OF THE DISCLOSURE

According to an aspect of the present disclosure, an assembly is provided for an aircraft powerplant. This assembly includes a first powerplant component, a second powerplant component, a third powerplant component and a fluid system. The fluid system includes a first fluid circuit, a second fluid circuit, a third fluid circuit and a heat exchanger. The first fluid circuit extends through the heat exchanger and is configured to service the first powerplant component. The second fluid circuit extends through the heat exchanger and is configured to service the second powerplant component. The third fluid circuit extends through the heat exchanger and is configured to service the third powerplant component. The heat exchanger is configured as or otherwise includes a radiator.

According to another aspect of the present disclosure, another assembly is provided for an aircraft powerplant. This assembly includes a turbine engine, a first electric machine, a first electric machine controller, a second electric machine, a second electric machine controller and a fluid system. The turbine engine includes an engine component. The first electric machine controller is configured to control operation of the first electric machine. The first electric machine is operatively coupled to the turbine engine. The second electric machine controller is configured to control operation of the second electric machine. The second electric machine is operatively coupled to the turbine engine. The fluid system includes a first fluid circuit, a second fluid circuit, a third fluid circuit and a heat exchanger. The first fluid circuit extends through the heat exchanger and is configured to cool and/or lubricate the first electric machine and/or the first electric machine controller. The second fluid circuit extends through the heat exchanger and is configured to cool and/or lubricate the second electric machine and/or the second electric machine controller. The third fluid circuit extends through the heat exchanger and is configured to cool and/or lubricate the engine component.

According to still another aspect of the present disclosure, another assembly is provided for an aircraft powerplant. This assembly includes a first powerplant component, a second powerplant component, a third powerplant component and a fluid system. The fluid system includes a first fluid circuit, a second fluid circuit, a third fluid circuit and a heat exchanger. The first fluid circuit extends through the heat exchanger and is configured to cool and/or lubricate the first powerplant component. The first fluid circuit includes a first flow regulator internal to the heat exchanger and is configured to regulate a flow of a first fluid in the heat exchanger. The second fluid circuit extends through the heat exchanger and is configured to cool and/or lubricate the second powerplant component. The third fluid circuit extends through the heat exchanger and is configured to cool and/or lubricate the third powerplant component.

The second fluid circuit may include a second flow regulator internal to the heat exchanger and configured to regulate a flow of a second fluid in the heat exchanger.

The third fluid circuit may include a third flow regulator internal to the heat exchanger and configured to regulate a flow of a third fluid in the heat exchanger.

The first fluid circuit may be fluidly independent of the second fluid circuit and the third fluid circuit.

The second fluid circuit may be fluidly independent of the third fluid circuit.

The first fluid circuit may include a first flow regulator configured to regulate a flow of a first fluid in the heat exchanger. In addition or alternatively, the second fluid circuit may include a second flow regulator configured to regulate a flow of a second fluid in the heat exchanger. In addition or alternatively, the third fluid circuit may include a third flow regulator configured to regulate a flow of a third fluid in the heat exchanger.

The first flow regulator may be disposed in the heat exchanger where the first fluid circuit includes the first flow regulator. In addition or alternatively, the second flow regulator may be disposed in the heat exchanger where the second fluid circuit includes the second flow regulator. In addition or alternatively, the third flow regulator may be disposed in the heat exchanger where the third fluid circuit includes the third flow regulator.

The first flow regulator may be configured to meter the flow of the first fluid in the heat exchanger where the first fluid circuit includes the first flow regulator. In addition or alternatively, the second flow regulator may be configured to meter the flow of the second fluid in the heat exchanger where the second fluid circuit includes the second flow regulator. In addition or alternatively, the third flow regulator may be configured to meter the flow of the third fluid in the heat exchanger where the third fluid circuit includes the third flow regulator.

The first flow regulator may be configured to selectively direct the flow of the first fluid into a first circuit first path and/or a first circuit second path in the heat exchanger where the first fluid circuit includes the first flow regulator. In addition or alternatively, the second flow regulator may be configured to selectively direct the flow of the second fluid into a second circuit first path and/or a second circuit second path in the heat exchanger where the second fluid circuit includes the second flow regulator. In addition or alternatively, the third flow regulator may be configured to selectively direct the flow of the third fluid into a third circuit first path and/or a third circuit second path in the heat exchanger where the third fluid circuit includes the third flow regulator.

The heat exchanger may include an air passage. The heat exchanger may be configured to: exchange heat energy between air flowing through the air passage with a first fluid flowing through the first fluid circuit within the heat exchanger; exchange heat energy between the air flowing through the air passage with a second fluid flowing through the second fluid circuit within the heat exchanger; and/or exchange heat energy between the air flowing through the air passage with a third fluid flowing through the third fluid circuit within the heat exchanger.

The heat exchanger may be configured to: exchange heat energy between a first fluid flowing through the first fluid circuit with a second fluid flowing through the second fluid circuit; exchange heat energy between the first fluid flowing through the first fluid circuit with a third fluid flowing through the third fluid circuit; and/or exchange heat energy between the second fluid flowing through the second fluid circuit with the third fluid flowing through the third fluid circuit.

The first fluid circuit may include a first liquid. The first fluid circuit may be configured to cool and/or lubricate the first powerplant component with the first liquid. In addition or alternatively, the second fluid circuit may include a second liquid. The second fluid circuit may be configured to cool and/or lubricate the second powerplant component with the second liquid. In addition or alternatively, the third fluid circuit may include a third liquid. The third fluid circuit may be configured to cool and/or lubricate the third powerplant component with the third liquid.

The assembly may also include an engine core and a flowpath. The engine core may include a compressor section, a combustor section and a turbine section. The flowpath may be configured to bypass the engine core. The heat exchanger may be arranged along a peripheral boundary of the flowpath.

The assembly may also include an engine core, a flowpath and an air circuit. The engine core may include a compressor section, a combustor section and a turbine section. The flowpath may be configured to bypass the engine core. The air circuit may be configured to bleed air from the flowpath and direct the air through and/or along the heat exchanger.

The heat exchanger may include a plurality of heat exchange elements. The first fluid circuit may include a first circuit channel extending in a first of the heat exchange elements. The second fluid circuit may include a second circuit channel extending in the first of the heat exchange elements. The third fluid circuit may include a third circuit channel extending in the first of the heat exchange elements. The first circuit channel may be fluidly independent of the second circuit channel and the third circuit channel within the first of the heat exchange elements. The second circuit channel may be fluidly independent of the third circuit channel within the first of the heat exchange elements.

The assembly may also include a first electric machine, a first electric machine controller, a second electric machine and a second electric machine controller. The first electric machine controller may be configured to control operation of the first electric machine. The first powerplant component may be configured as or otherwise include the first electric machine or the first electric machine controller. The second electric machine controller may be configured to control operation of the second electric machine. The second powerplant component may be configured as or otherwise include the second electric machine or the second electric machine controller.

The first powerplant component may be configured as or otherwise include the first electric machine. The first fluid circuit may also be configured to service the first electric machine controller. In addition or alternatively, the second powerplant component may be configured as or otherwise include the second electric machine. The second fluid circuit may also be configured to service the second electric machine controller.

The assembly may also include a turbine engine. The third powerplant component may be configured as a part of and disposed within an interior of the turbine engine.

The assembly may also include a compressor section, a combustor section, a turbine section, a flowpath, a first rotating structure and a second rotating structure. The flowpath may extend through the compressor section, the combustor section and the turbine section. The first rotating structure may include a first bladed rotor disposed in the compressor section or the turbine section. The first rotating structure may be operatively coupled to the first electric machine. The second rotating structure may be rotationally independent of the first rotating structure. The second rotating structure may include a second bladed rotor disposed in the compressor section or the turbine section. The second rotating structure may be operatively coupled to the second electric machine.

The first electric machine may be configurable as a first electric motor and/or a first electric generator. In addition or alternatively, the second electric machine may be configurable as a second electric motor and/or a second electric generator.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
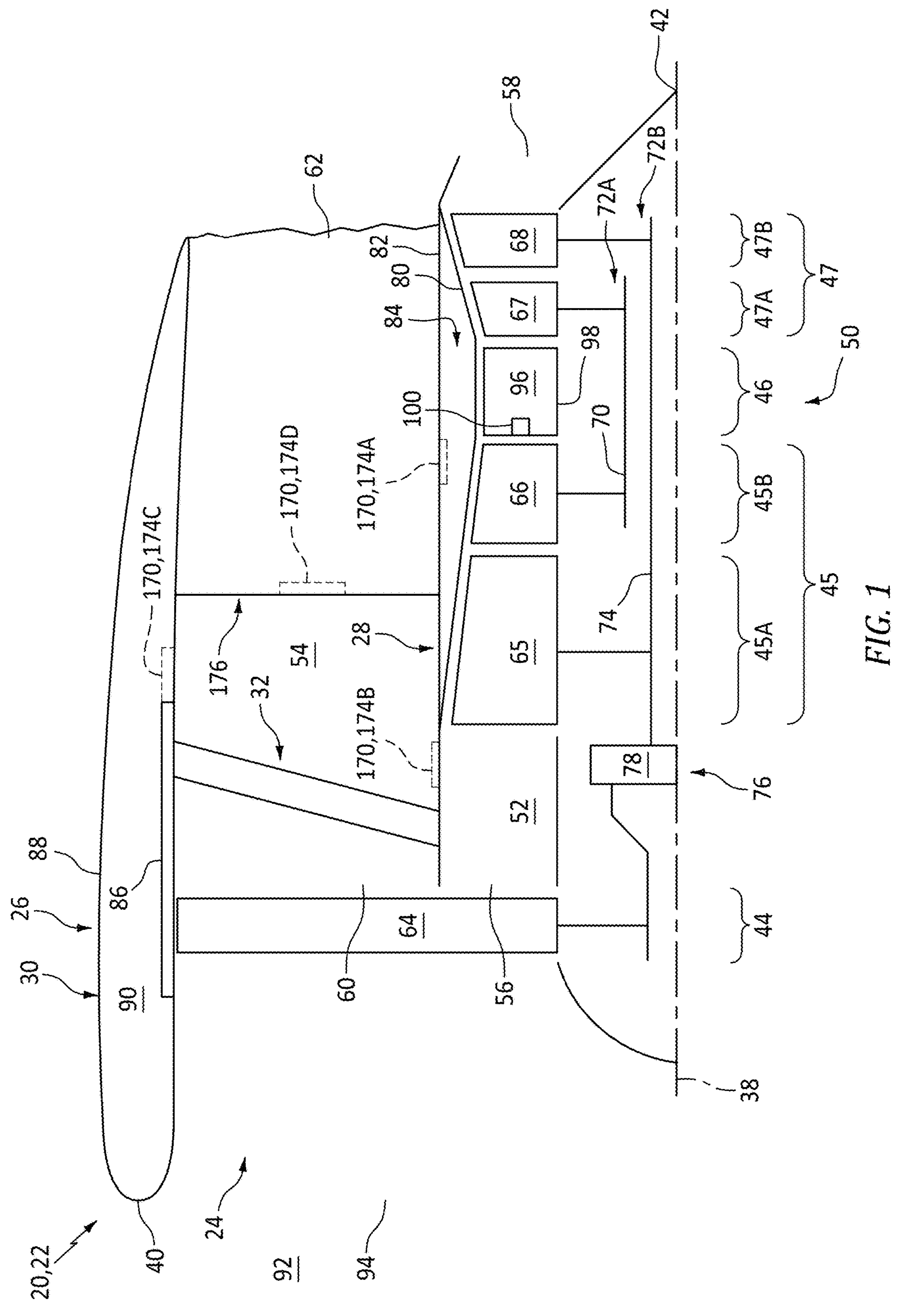
FIG. 1 is a partial schematic illustration of an aircraft propulsion system with a ducted propulsor rotor.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and a working fluid system 36 (see FIG. 3). The aircraft propulsion system 22 extends axially along an axis 38 between an axial upstream, forward end 40 of the aircraft propulsion system 22 and an axial downstream, aft end 42 of the aircraft propulsion system 22. Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. At least (or only) the LPC section 45A, the HPC section 45B, the combustor section 46, the HPT section 47A and the LPT section 47B collectively form a core 50 (e.g., a gas generator) of the turbine engine 24. The aircraft propulsion system 22 and its turbine engine 24 of FIG. 1 also include a core flowpath 52 (e.g., an annular core flowpath) and a bypass flowpath 54 (e.g., an annular bypass flowpath). The core flowpath 52 extends sequentially through the LPC section 45A, the HPC section 45B, the combustor section 46, the HPT section 47A and the LPT section 47B from an airflow inlet 56 into the core flowpath 52 to a combustion products exhaust 58 out from the core flowpath 52. The bypass flowpath 54 extends through a bypass duct from an airflow inlet 60 into the bypass flowpath 54 to an airflow exhaust 62 from the bypass flowpath 54, where the bypass duct may be formed by the inner housing structure 28 and the outer housing structure 30. The bypass flowpath 54 and its bypass duct are configured to bypass (e.g., are disposed radially outboard of and extend along) the engine core 50 and the inner housing structure 28.

The propulsor section 44, the LPC section 45A, the HPC section 45B, the combustor section 46, the HPT section 47A and the LPT section 47B may be arranged sequentially along the propulsion system axis 38 within the propulsion system housing 26. The propulsor section 44 includes a bladed propulsor rotor 64; e.g., a fan rotor. The LPC section 45A includes a bladed low pressure compressor (LPC) rotor 65. The HPC section 45B includes a bladed high pressure compressor (HPC) rotor 66. The HPT section 47A includes a bladed high pressure turbine (HPT) rotor 67. The LPT section 47B includes a bladed low pressure turbine (LPT) rotor 68. Each of these engine rotors 64-68 includes a rotor base (e.g., a disk or a hub) and a plurality of rotor blades (e.g., airfoils, vanes, etc.). The rotor blades may be arranged into one or more stages axially along the respective engine rotor 64-68. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 66 is coupled to and rotatable with the HPT rotor 67. The HPC rotor 66 of FIG. 1, for example, is connected to the HPT rotor 67 through a high speed shaft 70. At least (or only) the HPC rotor 66, the HPT rotor 67 and the high speed shaft 70 collectively form a high speed rotating structure 72A; e.g., a high speed spool of the turbine engine 24 and its engine core 50. This high speed rotating structure 72A of FIG. 1 and its members 66, 67 and 70 are rotatable about the propulsion system axis 38. However, it is contemplated the high speed rotating structure 72A may alternatively be rotatable about another axis radially and/or angularly offset from the rotational axis of the propulsor rotor 64 and/or the centerline axis of the turbine engine 24.

The LPC rotor 65 is coupled to and rotatable with the LPT rotor 68. The LPC rotor 65 of FIG. 1, for example, is connected to the LPT rotor 68 through a low speed shaft 74. At least (or only) the LPC rotor 65, the LPT rotor 68 and the low speed shaft 74 collectively form a low speed rotating structure 72B; e.g., a low speed spool of the turbine engine 24 and its engine core 50. This low speed rotating structure 72B of FIG. 1 and its members 65, 68 and 74 are rotatable about the propulsion system axis 38. However, it is contemplated the low speed rotating structure 72B may alternatively be rotatable about another axis radially and/or angularly offset from the rotational axis of the propulsor rotor 64 and/or the centerline axis of the turbine engine 24.

The low speed rotating structure 72B is coupled to the propulsor rotor 64 through a propulsor drivetrain 76. The propulsor drivetrain 76 may be configured as a geared drivetrain, where a geartrain 78 (e.g., a transmission, a speed change device, an epicyclic geartrain, etc.) is disposed between and operatively couples the propulsor rotor 64 to the low speed rotating structure 72B and its LPT rotor 68. With this arrangement, the propulsor rotor 64 may rotate at a different (e.g., slower) rotational speed than the low speed rotating structure 72B and its LPT rotor 68. Here, the propulsor rotor 64 and the low speed rotating structure 72B may rotate in a common (the same) direction about the propulsion system axis 38 or in opposite directions about the propulsion system axis 38 depending, for example, upon the specific configuration of the geartrain 78. Alternatively, the propulsor drivetrain 76 may be configured as a direct-drive drivetrain, where the geartrain 78 is omitted. With such an arrangement, the propulsor rotor 64 rotates at a common (the same) rotational speed as the low speed rotating structure 72B and its LPT rotor 68.

The inner housing structure 28 of FIG. 1 includes an inner case 80 (e.g., a core case) for the turbine engine 24, an inner nacelle structure 82 (sometimes referred to as an inner fixed structure (IFS)) and an internal inner housing compartment 84 (e.g., an engine core compartment). The inner case 80 is disposed radially outboard of, extends axially along and may circumscribe one or more or all of the engine sections 45A-47B and the engine rotors 65-68. The inner case 80 may thereby house and provide a support structure for the respective engine sections 45A-47B and the engine rotors 65-68. The inner nacelle structure 82 is configured to provide an aerodynamic cover over the engine core 50 and its inner case 80. At least (or only) the inner housing structure 28 and its inner nacelle structure 82 may collectively form a radial inner peripheral boundary of the bypass flowpath 54. The inner housing compartment 84 of FIG. 1 is formed by and is disposed radially between the inner case 80 and an inner barrel of the inner nacelle structure 82.

The outer housing structure 30 of FIG. 1 includes an outer case 86 (e.g., a fan case) for the turbine engine 24, an outer nacelle structure 88 and an internal outer housing compartment 90. The outer case 86 is disposed radially outboard of, extends axially along and may circumscribe the propulsor section 44 and its propulsor rotor 64. The outer case 86 may thereby house and may be configured as a containment structure for the propulsor section 44 and its propulsor rotor 64. The outer nacelle structure 88 is configured to provide an aerodynamic cover over the outer case 86. At least (or only) the outer housing structure 30 and its outer nacelle structure 88 may collectively form a radial outer peripheral boundary of the bypass flowpath 54. The outer housing compartment 90 of FIG. 1 is formed by and is disposed radially between the outer case 86 and the outer nacelle structure 88; e.g., outer cowls of the outer nacelle structure 88.

During operation of the aircraft propulsion system 22 of FIG. 1, ambient air from an environment 92 external to the aircraft and its aircraft propulsion system 22 enters the aircraft propulsion system 22 and its turbine engine 24 through an airflow inlet 94. This air is propelled by the rotating propulsor rotor 64 in a downstream, aft direction towards the propulsion system aft end 42.

An outer stream of the air propelled by the rotating propulsor rotor 64 is directed into the bypass flowpath 54 through its bypass inlet 60, which air entering the bypass flowpath 54 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 62 to provide forward thrust. The propulsion of the bypass air may account for a majority of the forward thrust generated by the aircraft propulsion system 22 and its turbine engine 24 of FIG. 1.

An inner stream of the air propelled by the rotating propulsor rotor 64 is directed into the core flowpath 52 through its core inlet 56, which air entering the core flowpath 52 may be referred to as "core air". This core air is compressed by the LPC rotor 65 and the HPC rotor 66 and is directed into a combustion chamber 96 (e.g., annular combustion chamber) of a combustor 98 (e.g., annular combustor) in the combustor section 46. Fuel is injected into the combustion chamber 96 by one or more fuel injectors 100 and mixed with the compressed core air to provide a fuel-air mixture. This fuel-air mixture is ignited and combustion products thereof flow through and sequentially drive rotation of the HPT rotor 67 and the LPT rotor 68. The rotation of the HPT rotor 67 and the LPT rotor 68 respectively drive rotation of the HPC rotor 66 and the LPC rotor 65 and, thus, compression of the air received from the core inlet 56. The rotation of the LPT rotor 68 also drives rotation of the propulsor rotor 64 through the propulsor drivetrain 76.

Figure 2:
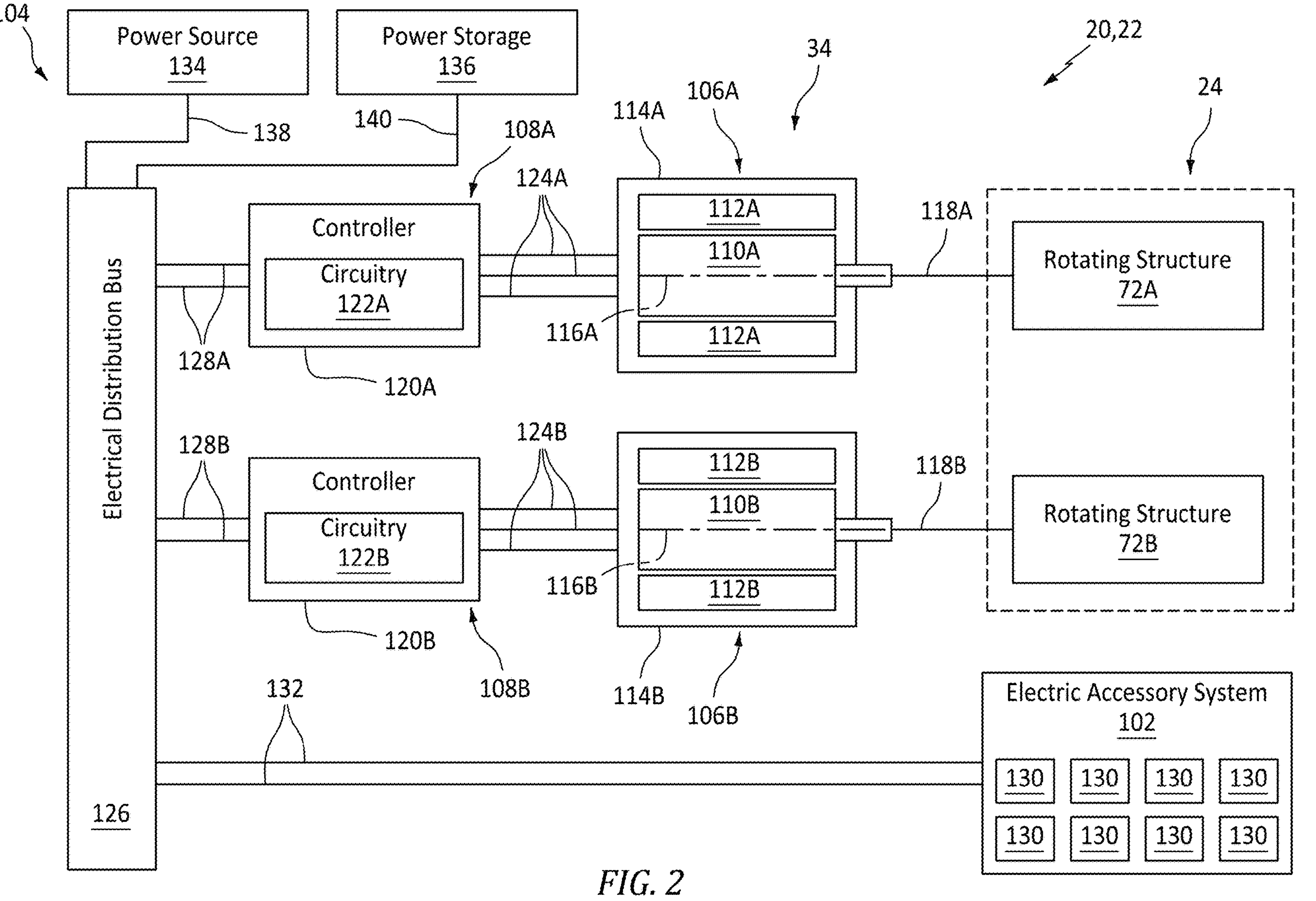
FIG. 2 is a schematic illustration of a portion of the aircraft propulsion system with an electric machine system.

Referring to FIG. 2, the electric machine system 34 is electrically coupled to an optional electric accessory system 102 and an electrical system 104 for the aircraft and its aircraft propulsion system 22. The electric machine system 34 of FIG. 2 includes one or more electric machines 106A and 106B (generally referred to as "106") and one or more electric machine (EM) controllers 108A and 108B (generally referred to as "108"). For ease of description, each electric machine 106 of FIG. 2 is described below as being electrically coupled to, controlled by and/or otherwise associated with a single, dedicated EM controller 108. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with the single electric machine.

Each electric machine 106A, 106B of FIG. 2 includes an electric machine rotor 110A, 110B (generally referred to as "110"), an electric machine stator 112A, 112B (generally referred to as "112") and an electric machine housing 114A, 114B (generally referred to as "114"); e.g., a case. The machine rotor 110A, 110B is rotatable about a rotational axis 116A, 116B (generally referred to as "116") of the respective machine rotor 110A, 110B, which electric machine (EM) axis 116 may also be a centerline axis of the respective electric machine 106. The machine stator 112 of FIG. 2 is radially outboard of and circumscribes the machine rotor 110. With this arrangement, each electric machine 106 is configured as a radial flux electric machine. The electric machines 106 of the present disclosure, however, are not limited to such an exemplary rotor-stator configuration nor to radial flux arrangements. The machine rotor 110, for example, may alternatively be radially outboard of and circumscribe the machine stator 112. In another example, the machine rotor 110 may be axially next to the machine stator 112 configuring the electric machine 106 as an axial flux electric machine. Referring again to FIG. 2, the machine rotor 110 and the machine stator 112 are at least partially or completely housed within an interior of the machine housing 114.

Each electric machine 106A, 106B may be operatively coupled to a respective one of the engine rotating structures 72A, 72B (generally referred to as "72"). Each machine rotor 110A, 110B of FIG. 2, for example, is mechanically coupled to and rotatable with the respective engine rotating structure 72A, 72B through an engine-electric machine drivetrain 118A, 118B (generally referred to as "118"). This engine-electric machine drivetrain 118 may be configured as or otherwise include a shaft, a tower shaft assembly, an accessory gearbox, an angle gearbox, and/or the like. For ease of description, each machine rotor 110 of FIG. 2 is described below as being coupled to and rotatable with a unique one of the engine rotating structures 72 of the turbine engine 24. However, it is contemplated multiple machine rotors may alternatively be coupled to and rotatable with a common engine rotating structure; e.g., 72A or 72B. It is also contemplated a single one of the machine rotors may be coupled to and rotatable with multiple engine rotating structures, directly or through another device such as a differential or a clutch system. In addition, while the electric machines 106 are described above as being coupled to the engine rotating structures 72, it is contemplated the machine rotor 110 of one or more of the electric machines 106 may also or alternatively be operatively coupled to another rotating device through the engine-electric machine drivetrain 118 such as, but not limited to, a pump rotor, an auxiliary compressor rotor, an actuator rotor, or the like.

Each electric machine 106 of FIG. 2 may be configurable as an electric motor and/or an electric generator; e.g., an electric motor-generator. For example, during a respective motor mode of operation, each electric machine 106 may operate as the electric motor to convert electricity received from the aircraft electrical system 104 into mechanical power. The machine stator 112, for example, may generate an electromagnetic field with the machine rotor 110 using a current of electricity received from the aircraft electrical system 104 through the respective EM controller 108. This electromagnetic field may drive rotation of the machine rotor 110. The machine rotor 110, in turn, may provide mechanical power to and drive rotation of the respective engine rotating structure 72 through the respective engine-electric machine drivetrain 118. This mechanical power may be provided to boost power or completely power the rotation of the respective engine rotating structure 72. By contrast, during a respective generator mode of operation, each electric machine 106 may operate as the electric generator to convert mechanical power received from the respective engine rotating structure 72 into electricity. Rotation of the machine rotor 110, for example, may be rotationally driven by rotation of the respective engine rotating structure 72 through the engine-electric machine drivetrain 118. The rotation of the machine rotor 110 may generate an electromagnetic field with the machine stator 112, and the machine stator 112 may convert energy from the electromagnetic field into electricity. The electric machine 106 may then provide a current of electricity to the aircraft electrical system 104 through the respective EM controller 108 for storage and/or further use. The electric machines 106 of the present disclosure, however, are not limited to such exemplary operation. For example, one or more of the electric machines 106 may each alternatively be configured as a dedicated electric generator; e.g., without the electric motor functionality. In another example, one or more of the electric machines 106 may each alternatively be configured as a dedicated electric motor; e.g., without the electric generator functionality.

Each EM controller 108A, 108B includes a controller housing 120A, 120B (generally referred to as "120") and internal controller circuitry 122A, 122B (generally referred to as "122"). The controller housing 120 may be configured as an enclosed case (e.g., a closed or sealed container) for the respective controller circuitry 122. The controller circuitry 122 is disposed within an interior of the respective controller housing 120; e.g., an internal chamber or other volume(s) within and enclosed by the controller housing 120. The controller circuitry 122 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer(s), electrical rectifier(s), and/or the like.

Each EM controller 108A, 108B is electrically coupled to the respective electric machine 106A, 106B through one or more electric cables 124A, 124B (generally referred to as "124"); e.g., high voltage electric cables, power feeder cables, etc. More particularly, the controller circuitry 122 of each EM controller 108 is electrically coupled to the respective electric machine 106 and its machine stator 112 through the respective electric cables 124. Similarly, each EM controller 108A, 108B is electrically coupled to an electrical distribution bus 126 of the aircraft electrical system 104 through one or more electric cables 128A, 128B (generally referred to as "128"); e.g., high voltage electric cables, power feeder cables, etc. More particularly, the controller circuitry 122 of each EM controller 108 is electrically coupled to the aircraft electrical system 104 and its electrical distribution bus 126 through the respective electric cables 128.

Each EM controller 108 and its controller circuitry 122 are configured to control operation of the respective electric machine 106. For example, when operating as the electric motor, each EM controller 108 and its controller circuitry 122 are configured to regulate a flow of electricity from the aircraft electrical system 104 to the respective electric machine 106. This electricity flow regulation may include: (a) turning-on the flow of electricity from the aircraft electrical system 104 to the respective electric machine 106 (e.g., electrically coupling the respective electric machine 106 to the aircraft electrical system 104); (b) turning-off the flow of electricity from the aircraft electrical system 104 to the respective electric machine 106 (e.g., electrically decoupling the respective electric machine 106 from the aircraft electrical system 104); (c) moderating the flow of electricity from the aircraft electrical system 104 to the respective electric machine 106. Here, each EM controller 108 operates as a motor controller. In another example, when operating as the electric generator, each EM controller 108 and its controller circuitry 122 are configured to regulate a flow of electricity from the respective electric machine 106 to the aircraft electrical system 104. This electricity flow regulation may include: (a) turning-on the flow of electricity from the respective electric machine 106 to the aircraft electrical system 104 (e.g., electrically coupling the respective electric machine 106 to the aircraft electrical system 104); (b) turning-off the flow of electricity from the respective electric machine 106 to the aircraft electrical system 104 (e.g., electrically decoupling the respective electric machine 106 from the aircraft electrical system 104); (c) moderating the flow of electricity from the respective electric machine 106 to the aircraft electrical system 104. Here, the EM controller 108 operates as a generator controller.

The electric accessory system 102 includes one or more electric devices 130. The electric devices 130 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 130 of FIG. 2 may be configured as part of one or more sub-systems for the aircraft propulsion system 22 and its turbine engine 24. Examples of these sub-systems include, but are not limited to: a fuel system for delivering the fuel to the fuel injectors 100 (see FIG. 1); a lubrication system for delivering lubricant (e.g., oil) to one or more lubricated components (e.g., bearing(s), gear system(s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices.

Each electric device 130 is electrically coupled to the electrical distribution bus 126 of the aircraft electrical system 104 through one or more electric cables 132 (collectively schematically shown); e.g., high voltage electric cables, low voltage electric cables, power feeder cables, etc. Each electric device 130 may thereby receive a current of electricity from the aircraft electrical system 104 to power operation thereof.

The aircraft electrical system 104 includes the electrical distribution bus 126. This aircraft electrical system 104 may also include a power source 134 and/or a power storage 136. The electrical distribution bus 126 is electrically coupled to each electric machine 106 through the respective EM controller 108. The electrical distribution bus 126 is electrically coupled to each of the electric devices 130. The electrical distribution bus 126 is also electrically coupled to the power source 134 and the power storage 136, respectively schematically shown via lines 138 and 140. With this arrangement, the electrical distribution bus 126 provides an intermediate connection between the various electrical aircraft propulsion system members 106A (via 108A), 106B (via 108B), 130, 134 and/or 136. The power source 134 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 136 is configured to receive electricity from the electrical distribution bus 126 for storage. The power storage 136 is also configured to provide the stored electricity to the electrical distribution bus 126. The power storage 136, for example, may be configured as or otherwise include one or more electricity storage devices; e.g., batteries, super capacitors, etc. With the foregoing aircraft electrical system arrangement, the electrical current provided to one, some or all of the electric devices 130 may be received, through the electrical distribution bus 126, from any one, some or all of the electrical aircraft propulsion system members 106A, 106B, 134 and/or 136. It is also contemplated the electrical current provided to one of the electric machines 106 may be received from another one of the electric machines 106 through the aircraft electrical system 104 and its electrical distribution bus 126.

Figure 3:
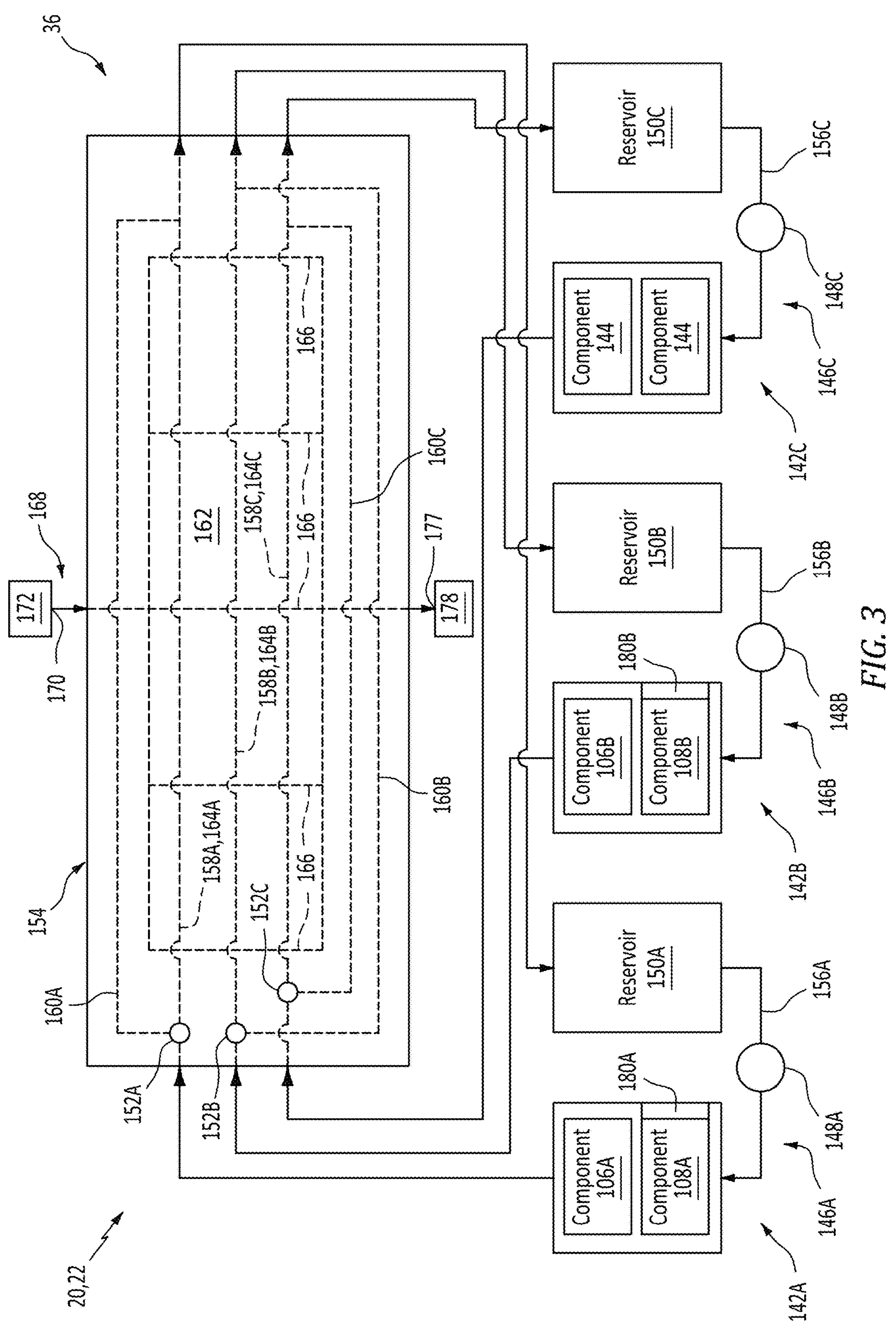
FIG. 3 is a schematic illustration of a portion of the aircraft propulsion system with a working fluid system.

Referring to FIG. 3, the working fluid system 36 may be configured as a heat exchange and/or lubrication system for various components of the aircraft propulsion system 22. The working fluid system 36 of FIG. 3, for example, includes a plurality of discrete fluid circuits 142A, 142B and 142C (generally referred to as "142"); e.g., fluidly decoupled circuits, fluidly independent circuits, etc. Each of these fluid circuits 142 may be configured to service (e.g., cool and/or lubricate) a different set of one or more powerplant components. For example, the electric machine (EM) system first fluid circuit 142A is configured to cool and/or lubricate at least (or only) the first electric machine 106A and/or the first EM controller 108A using a first circuit working fluid. The electric machine (EM) system second fluid circuit 142B is configured to cool and/or lubricate at least (or only) the second electric machine 106B and/or the second EM controller 108B using a second circuit working fluid. The engine fluid circuit 142C is configured to cool and/or lubricate one or more components 144 of the turbine engine 24 and its engine core 50 (see FIG. 1) using an engine circuit working fluid. Examples of the engine components 144 which may be serviced by the engine fluid circuit 142C may include engine bearing(s) supporting the low speed rotating structure 72B (see FIG. 1), engine bearing(s) supporting the high speed rotating structure 72A (see FIG. 1), engine bearing(s) supporting the propulsor rotor 64 (see FIG. 1), internal component(s) of and/or support components for the geartrain 78 (see FIG. 1), internal component(s) of and/or support components for the engine-electric machine drivetrain(s) 118 (see FIG. 2), lubricated seal member(s), and engine heat exchanger(s). The present disclosure, however, is not limited to such exemplary engine components. It is contemplated, for example, the engine components 144 may also or alternatively include various other components of the turbine engine 24 which are configured external to and/or housed within the inner housing structure 28 and its inner case 80 (see FIG. 1).

By dividing the working fluid system 36 into the discrete fluid circuits 142, each fluid circuit 142 may be individually tuned based on cooling and/or lubrication requirements for one or more of its serviced propulsion system components. For example, the EM system first fluid circuit 142A may be tuned for specific heat loads generated by one or more of the electric machine system members 106A and 108A and/or a working temperature range for one or more of the electric machine system members 106A and 108A. The EM system second fluid circuit 142B may be tuned for specific heat loads generated by one or more of the electric machine system members 106B and 108B and/or a working temperature range for one or more of the electric machine system members 106B and 108B. The engine fluid circuit 142C may be tuned for specific heat loads generated by one or more of the engine components 144 and/or a working temperature range for one or more of the engine components 144. To this end, the working temperature range for the electric machine system members 106A and 108A and the working temperature range for the electric machine system members 106B and 108B may be different (e.g., lower or higher) than the working temperature range for the engine components 144. The working temperature range for the electric machine system members 106A and/or 108A may also be different (e.g., lower or higher) than the working temperature range for the electric machine system members 106B and/or 108B. Alternatively, the working temperature range for the electric machine system members 106A and/or 108A may also be the same as the working temperature range for the electric machine system members 106B and/or 108B. Moreover, while the first circuit working fluid, the second circuit working fluid and the engine circuit working fluid may have a common composition (e.g., the same chemical constituent(s)), some or all of these working fluids may alternatively have different compositions (e.g., chemical constituent(s)) to further tune one or more heat exchange and/or lubrication parameters for the respective fluid circuit 142. Similarly, while the fluid circuits 142 may share one or more common operational parameters (e.g., flow rate, pressure, etc.), some or all of these fluid circuits 142 may alternatively have different operational parameters further tuned for the respective set of propulsion system components.

In addition to the foregoing, by providing each set of powerplant component(s) with a dedicated fluid circuit, potential debris, flow blockages, etc. associated with one of the fluid circuits 142 will not affect operation of the other fluid circuit(s) 142. With this in mind, in an unlikely event a component (e.g., a pump, a valve, etc.) of the EM system first fluid circuit 142A (or alternatively the EM system second fluid circuit 142B) fails or is otherwise operationally derated (e.g., reduced in operational capacity, efficiency, etc.), operation of the electric machine system members 106A and 108A serviced by that EM system first fluid circuit 142A may also be operationally derated or turned-off; e.g., depowered, disconnected, disengaged, etc. However, since the electric machine system members 106B and 108B are serviced by the discrete EM system second fluid circuit 142B, the electric machine system members 106B and 108B may continue to operate unaffected by the non-operational or derated fluid circuit 142A. In addition, it is contemplated the electric machine system members 106B and 108B may be operated to provide redundancy for the derated or turned-off electric machine system members 106A and 108A.

Each fluid circuit 142A, 142B, 142C of FIG. 3 includes a circuit path 146A, 146B, 146C (generally referred to as "146"), which circuit path 146 is discrete (e.g., fluidly decoupled, fluidly independent) from the circuit paths 146 of each other fluid circuit 142. Each fluid circuit 142A, 142B, 142C includes a working fluid pump 148A, 148B, 148C (generally referred to as "148"), a working fluid reservoir 150A, 150B, 150C (generally referred to as "150") and a working fluid flow regulator 152A, 152B, 152C (generally referred to as "152"), where the circuit components 148, 150 and 152 in each fluid circuit 142 may be structurally and/or operationally independent from the like circuit components 148, 150 and 152 in the other fluid circuits 142. By contrast, the fluid circuits 142 may share a common heat exchanger 154. Of course, it is contemplated one, some or all of the fluid circuits 142 may (or may not) also each include one or more additional components arranged along the respective circuit path 146 such as, but not limited to, filter(s), sensor(s), additional heat exchanger(s), additional powerplant component(s), valve(s), pump(s), etc.

In each fluid circuit 142, the circuit components 152, 154, 150 and 148 may be arranged inline along the respective circuit path 146. Each circuit path 146 of FIG. 3, for example, extends serially through the respective circuit components 152, 154, 150 and 148 in a closed loop. Each circuit path 146 of FIG. 3 is also (a) fluidly coupled to and may extend in series or in parallel through and/or (b) may be otherwise arranged in thermal communication with the respective powerplant components (e.g., 106 and 108, 144) serviced by the respective fluid circuit 142. Note, while each set of powerplant components (e.g., 106 and 108, 144) is shown as being upstream of the heat exchanger 154 along the respective circuit path 146, it is contemplated one or more or all of these powerplant components (e.g., 106 and 108, 144) may alternatively be downstream of the heat exchanger 154 along the respective circuit path 146. In addition or alternatively, while the fluid reservoir 150 is shown as being downstream of the respective heat exchanger 154 along the respective circuit path 146, it is contemplated the fluid reservoir 150 may alternatively be upstream of the heat exchanger 154 along the respective circuit path 146. The present disclosure therefore is not limited to the exemplary fluid circuit arrangements shown in FIG. 3.

Each circuit path 146 may include a circuit leg 156A, 156B, 156C (generally referred to as "156"), a heat exchange leg 158A, 158B, 158C (generally referred to as "158") and a bypass leg 160A, 160B, 160C (generally referred to as "160"). The circuit leg 156 extends through the respective circuit components 150, 148, (106 and 108) or 144. The heat exchange leg 158 and the bypass leg 160 are each fluidly coupled to an outlet from the circuit leg 156 through the respective flow regulator 152. The heat exchange leg 158 and the bypass leg 160 are each fluidly coupled to an inlet into the circuit leg 156. With this arrangement, the heat exchange leg 158 and the bypass leg 160 are fluidly coupled in parallel between the circuit leg outlet and the circuit leg inlet. The heat exchange leg 158 extends through a radiator portion 162 of the heat exchanger 154. The bypass leg 160 bypasses (e.g., extends along and outside of) the radiator portion 162 of the heat exchanger 154.

The radiator portion 162 of the heat exchanger 154 includes one or more internal intra-circuit heat exchanger (HX) working fluid passages 164A, 164B and 164C (generally referred to as "164"; one schematically shown in FIG. 3) and one or more internal extra-circuit heat exchanger (HX) working fluid passages 166. Each of these HX working fluid passages 164, 166 may be partially or completely formed by the heat exchanger 154 and its radiator portion 162. Each of the HX working fluid passages 164, 166 also extends within and/or through the heat exchanger 154 and its radiator portion 162. The intra-circuit HX working fluid passages 164 may form at least a section of or may otherwise be fluidly coupled inline with the respective circuit path 146 and its heat exchange leg 158. The extra-circuit HX working fluid passages 166 may form at least a section of or may otherwise be fluidly coupled inline with a path of an air circuit 168. The intra-circuit HX working fluid passages 164 are thereby fluidly discrete from the extra-circuit HX working fluid passages 166 within the heat exchanger 154. Moreover, the intra-circuit HX working fluid passages 164 of each circuit path 146 are fluidly discrete from the intra-circuit HX working fluid passages 164 of the other circuit paths 146. Within the heat exchanger 154, each set of the intra-circuit HX working fluid passages 164 and the extra-circuit HX working fluid passages 166 may be arranged to configure the heat exchanger 154 as a crossflow heat exchanger, a counterflow heat exchanger, a parallel flow heat exchanger, or a hybrid heat exchanger with a combination crossflow, counterflow and/or parallel flow arrangement for that respective set of the intra-circuit HX working fluid passages 164 and the extra-circuit HX working fluid passages 166. Moreover, each set of the intra-circuit HX working fluid passages 164 may be arranged with one or both other sets of the intra-circuit HX working fluid passages 164 to configure the heat exchanger 154 as a crossflow heat exchanger, a counterflow heat exchanger, a parallel flow heat exchanger, or a hybrid heat exchanger with a combination crossflow, counterflow and/or parallel flow arrangement for the respective sets of the intra-circuit HX working fluid passages 164. In other words, the heat exchanger 154 may be configured to tune (e.g., maximize) heat transfer between each fluid circuit 142 and the air circuit 168 and/or between some or all of the fluid circuits 142 as described below in further detail.

Each pump 148 of FIG. 3 is configured to direct and/or regulate a flow of the respective working fluid through the respective circuit path 146 from an outlet from (e.g., a supply of) the respective fluid reservoir 150, through the respective set of propulsion system components (e.g., 106 and 108, 144) and the heat exchanger 154, to an inlet into (e.g., a return of) the respective fluid reservoir 150.

Each fluid reservoir 150 is configured to contain a quantity of the respective working fluid before, during and/or after fluid system operation. Each fluid reservoir 150, for example, may be configured as or otherwise include a tank, a cylinder, a pressure vessel, a bladder or any other type of (e.g., liquid) storage container. One or more of the fluid reservoirs (e.g., 150A, 150B) may be un-vented. In addition or alternatively, at least one of the fluid reservoirs (e.g., 150C) may be vented.

Each flow regulator 152 of FIG. 3 is configured to selectively fluidly couple the circuit leg 156 to the heat exchange leg 158 and/or the bypass leg 160 of the same fluid circuit 142. Each flow regulator 152, for example, may be configured as or otherwise include a flow diverter, a switching valve or a switching valve system. During a heat exchange mode of operation for a respective fluid circuit 142, the respective flow regulator 152 may fluidly couple the circuit leg 156 to the heat exchange leg 158. Here, the flow regulator 152 may also fluidly decouple the bypass leg 160 from the circuit leg 156. By contrast, during a bypass mode of operation for a respective fluid circuit 142, the respective flow regulator 152 may fluidly couple the circuit leg 156 to the bypass leg 160. Here, the flow regulator 152 may also fluidly decouple the heat exchange leg 158 from the circuit leg 156. Of course, it is also contemplated the respective flow regulator 152 may operate in a third mode of operation where the flow regulator 152 fluidly couples the circuit leg 156 to both the heat exchange leg 158 and the bypass leg 160 according to a controlled split ratio (e.g., 25:75, 50:50 or 75:25) between the heat exchange leg 158 and the bypass leg 160.

Each flow regulator 152 of FIG. 3 is disposed within and may be integrated with the heat exchanger 154. However, it is contemplated one or more of the flow regulators 152 may alternatively be disposed outside of the heat exchanger 154; e.g., mounted to a side of the heat exchanger 154 as a line replaceable unit (LRU).

The air circuit 168 is configured to supply pressurized air (e.g., bleed air, forced induction air, etc.) to the heat exchanger 154 and its radiator portion 162. An airflow inlet 170 into the air circuit 168, for example, may be fluidly coupled to an air source 172 such as, but not limited to, the bypass flowpath 54 of FIG. 1. For example, referring to FIG. 1, the circuit inlet 170 may be configured as or otherwise include a scoop (or scoops) and/or a bleed port (or bleed ports) disposed along the bypass flowpath 54. This circuit inlet 170 may be disposed at a location (e.g., 174A or 174B) along the inner peripheral boundary of the bypass flowpath 54. The circuit inlet 170 may alternatively be disposed at a location (e.g., 174C) along the outer peripheral boundary of the bypass flowpath 54. The circuit inlet 170 may still alternatively be disposed at a location (e.g., 174D) radially between the inner and the outer peripheral boundaries of the bypass flowpath 54; e.g., along a leading edge or a side of a bifurcation structure 176. The present disclosure, however, is not limited to such an exemplary air source. It is contemplated, for example, the air source 172 may alternatively be another flowpath within the aircraft propulsion system 22 or the external environment 92.

An airflow exhaust 177 of the air circuit 168 of FIG. 3 is also fluidly coupled to an air sink 178 such as the bypass flowpath 54 (see FIG. 1). For example, after the air is directed through the heat exchanger 154 and its radiator portion 162, the air may be exhausted back into the bypass flowpath 54 (see FIG. 1). Alternatively, the air circuit 168 may be configured to exhaust the air into another flowpath and/or compartment (e.g., the inner housing compartment 84) within the aircraft propulsion system 22. Still alternatively, the air circuit 168 may be configured to exhaust the air into the external environment 92 (see FIG. 1).

While the air circuit 168 is described above with an elongated air passage that extends from the circuit inlet 170, through the heat exchanger 154 and its radiator portion 162, to the circuit exhaust 177, the present disclosure is not limited to such an exemplary configuration. It is contemplated, for example, the heat exchanger 154 and its radiator may alternatively be disposed directly in a flowpath of the aircraft propulsion system 22; e.g., directly within and/or along a side of the bypass flowpath 54 or otherwise. Moreover, while the heat exchanger 154 is described as a radiator above, it is contemplated the air circuit 168 may be replaced by a liquid circuit such as a fuel circuit.

During operation of each fluid circuit 142 of FIG. 3, the pump 148 directs (e.g., pumps) relatively cool working fluid out of the fluid reservoir 150, through the circuit path 146, into the propulsion system components (e.g., 106, 144) and/or into a heat exchanger 180A, 180B (generally referred to as "180") (e.g., cooling plate) in thermal communication with the respective propulsion system component (e.g., 108A, 108B). As the working fluid flows through the propulsion system components (e.g., 106, 144) and/or the heat exchanger (e.g., 180) in thermal communication therewith, heat energy generated by the propulsion system components (e.g., 106, 108, 144) may be transferred into the working fluid. The heat energy transfer may thereby dissipate the heat energy in (e.g., cool) the propulsion system components (e.g., 106 and 108, 144) while also heating the working fluid. The working fluid may also lubricate one or more internal components within the propulsion system components (e.g., 106 and 108, 144). The now heated working fluid is directed away from the propulsion system components (e.g., 106 and 108, 144), through the circuit path 146, to the heat exchanger 154. Within the heat exchanger 154, each flow regulator 152 may direct at least some of the working fluid into the heat exchange leg 158 such that at least some or all of the heat energy previously transferred into the working fluid from the propulsion system components (e.g., 106 and 108, 144) is transferred out of the working fluid into the air flowing through the air circuit 168, thereby cooling the working fluid. The now cooled working fluid is directed from the heat exchanger 154, through the circuit path 146, back into the fluid reservoir 150 for subsequent recirculation. In addition, heat energy may also be transferred between the various working fluids while flowing through the common heat exchanger 154 and its radiator portion 162. Thus, the heat exchanger 154 may also operate as a liquid-to-liquid heat exchanger between the respective fluid circuits 142A, 142B and 142C. However, when the powerplant components serviced by a respective fluid circuit 142A, 142B and/or 142C do not need additional cooling, the flow regulator 152 may direct the working fluid through the bypass leg 160 back to the fluid reservoir 150 with little (if any) thermal interaction with the air in the air circuit 168 and/or the other working fluids in the other fluid circuits 142.

Figures 4A, 4B:
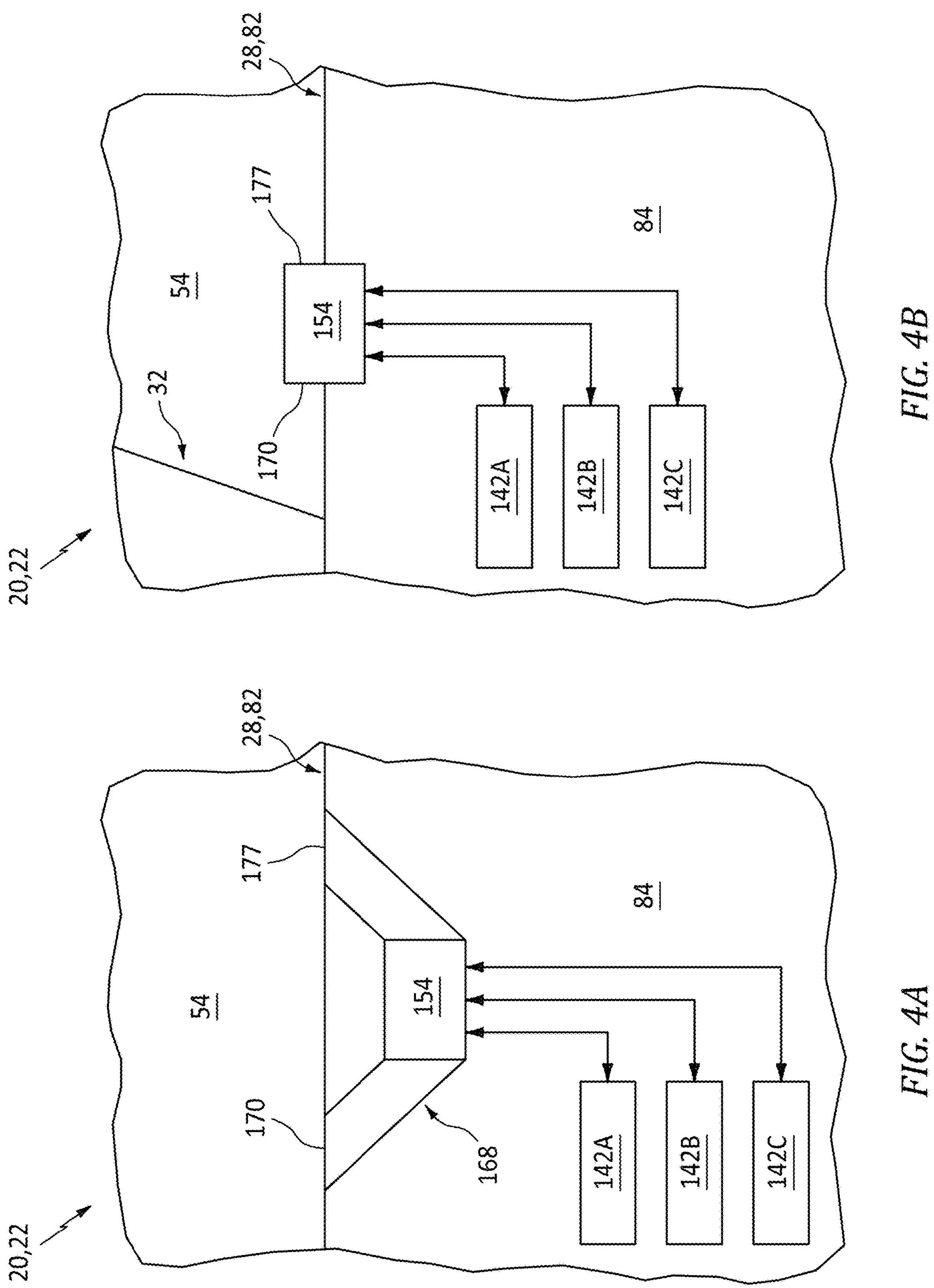
FIGS. 4A-D are partial schematic illustrations of the aircraft propulsion system with various fluid coupling arrangements between a heat exchanger and a bypass flowpath.

In some embodiments, referring to FIGS. 4A and 4B, the heat exchanger 154 may be arranged with the inner housing structure 28. The heat exchanger 154 of FIG. 4A, for example, is disposed within the inner housing compartment 84. The heat exchanger 154 of FIG. 4B is arranged along the inner nacelle structure 82. In other embodiments, referring to FIG. 4D, the heat exchanger 154 may be arranged with the outer housing structure 30. The heat exchanger 154 of FIG. 4D, for example, is arranged along the outer nacelle structure 88 and/or the outer case 86. In still other embodiments, referring to FIG. 4C, the heat exchanger 154 may be arranged with the bifurcation structure 176. The present disclosure, of course, is not limited to the foregoing exemplary heat exchanger locations. For example, it is contemplated the heat exchanger 154 may alternatively be disposed within the outer housing compartment 90 or with a pylon structure mounting the aircraft propulsion system 22 to a component of an airframe; e.g., an aircraft wing, an aircraft fuselage, etc.

Figures 4C, 4D:
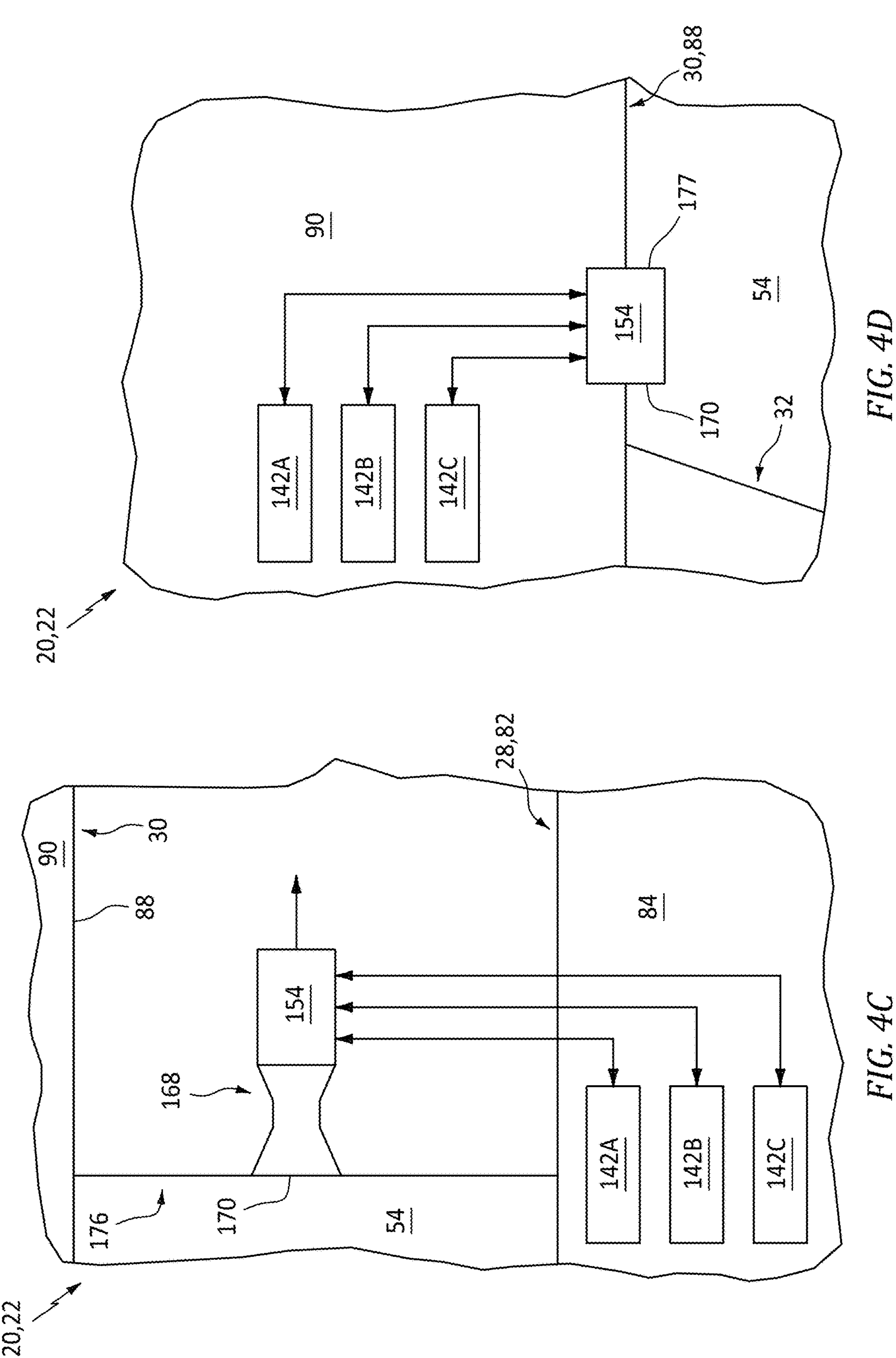

In some embodiments, referring to FIGS. 4A, 4B and 4C, one or more of the fluid circuit components of each fluid circuit 142 may be arranged with the inner housing structure 28; e.g., within the inner housing compartment 84. In other embodiments, referring to FIG. 4D, one or more of the fluid circuit components of each fluid circuit 142 may be arranged with the outer housing structure 30; e.g., within the outer housing compartment 90. The present disclosure, of course, is not limited to the foregoing exemplary fluid circuit component locations. For example, it is contemplated the one or more of the fluid circuit components of each fluid circuit 142 may alternatively be disposed with the pylon structure mounting the aircraft propulsion system 22 to the airframe component.

Figure 6:
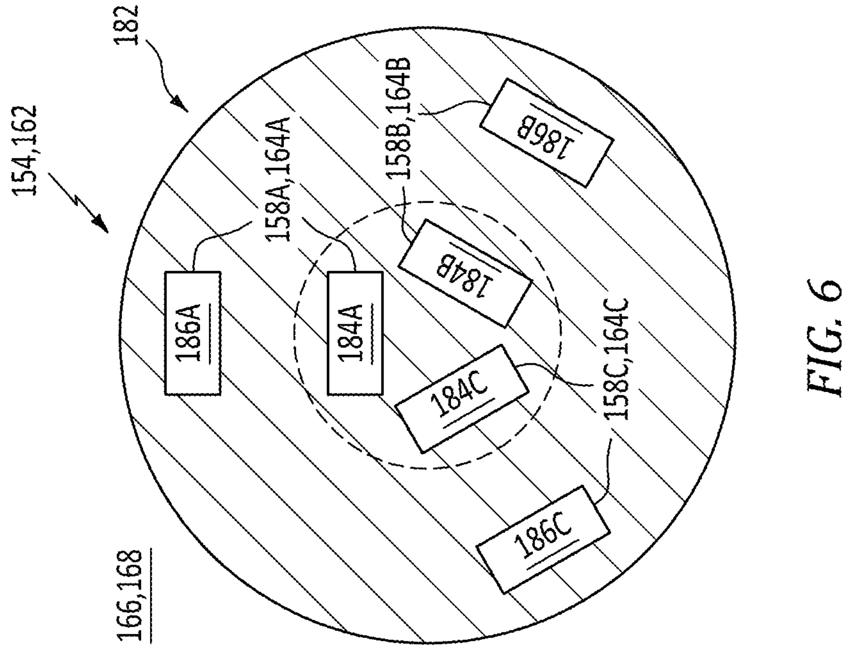
FIG. 6 is a cross-sectional illustration of a heat exchange element taken along line 6-6 in FIG. 5.
Figure 5:
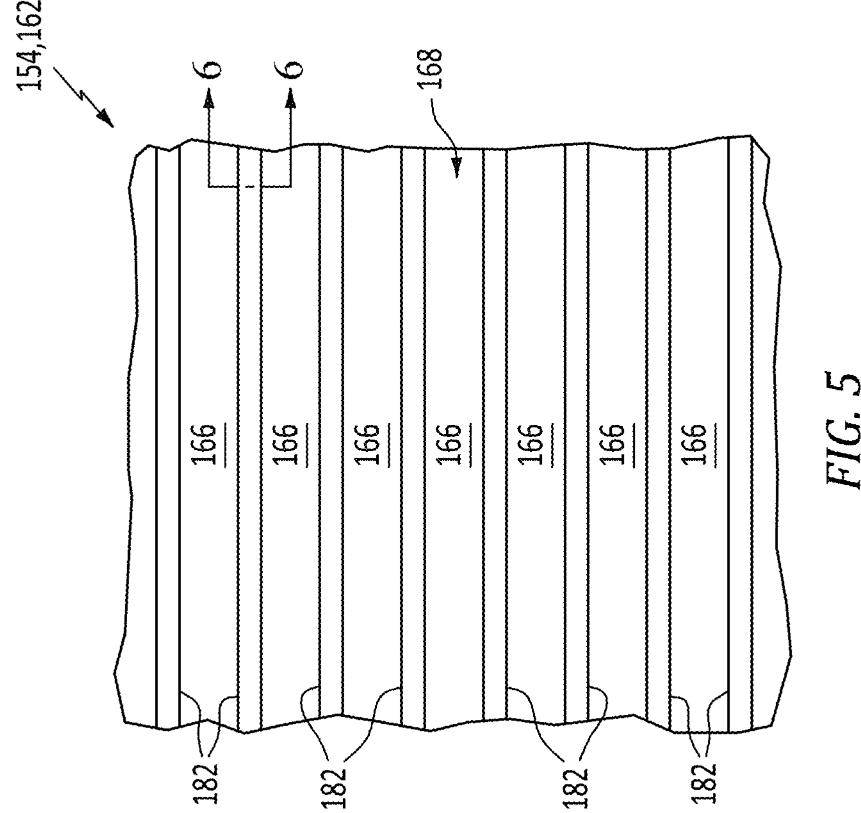
FIG. 5 is a schematic illustration of a portion of the heat exchanger.

In some embodiments, referring to FIG. 5, the radiator portion 162 of the heat exchanger 154 may include one or more heat exchange elements 182 (e.g., radiator tubes) exposed to and in contact with the air flowing through the air circuit 168. Referring to FIG. 6, each of these heat exchange elements 182 may include one or more inner channels 184A, 184B and 184C (generally referred to as "184") and one or more outer channels 186A, 186B and 186C (generally referred to as "186") for the fluid circuits 142A, 142B, 142C. The first circuit channels 184A and 186A of FIG. 6 may form one or more of the intra-circuit HX working fluid passages 164A for the first heat exchange leg 158A. The second circuit channels 184B and 186B of FIG. 6 may form one or more of the intra-circuit HX working fluid passages 164B for the second heat exchange leg 158B. The third circuit channels 184C and 186C of FIG. 6 may form one or more of the intra-circuit HX working fluid passages 164C for the third heat exchange leg 158C. The inner channels 184 are disposed inboard of the outer channels 186. These inner channels 184 facilitate heat transfer between the working fluids flowing through the fluid circuits 142. The outer channels 186 are disposed outboard of the inner channels 184 and proximate an outer periphery of the respective heat exchange element 182. These outer channels 186 facilitate heat transfer between the working fluids flowing through the fluid circuits 142 and the air flowing through the air circuit 168. In some embodiments, the working fluid within the inner channels 184 and the outer channels 186 may flow in a common direction; e.g., into or out of the page of FIG. 6. In other embodiments, the working fluid within the inner channels 184 and the outer channels 186 may flow in opposite directions.

The aircraft propulsion system 22 of FIG. 1 is described above as a ducted propulsor propulsion system; e.g., the turbofan propulsion system. The present disclosure, however, is not limited to such an exemplary aircraft propulsion system. For example, referring to FIG. 7, the outer housing structure 30 (see FIG. 1) may be omitted from the propulsion system housing 26 to open the propulsor rotor 64 up to the external environment 92. More particularly, the propulsor rotor 64 of FIG. 7 includes a plurality of open propulsor blades 188 arranged circumferentially about the propulsion system axis 38 in an array; e.g., a circular array. This array of the propulsor blades 188 may be unshrouded or alternatively shrouded by a tubular propulsor rotor shroud dedicated to the propulsor rotor 64 for example. Each of these propulsor blades 188 projects spanwise (e.g., radially) out from a base of the propulsor rotor 64, into the external environment 92, to a distal tip 190 of the respective propulsor blade 188. Each propulsor blade 188 is thereby configured as an un-ducted propulsor blade which is exposed to (e.g., disposed in) the surrounding external environment 92. With this arrangement, the propulsor rotor 64 is an open propulsor rotor (e.g., an un-ducted propulsor rotor) and the aircraft propulsion system 22 is configured as an open rotor propulsion system. Moreover, the inner housing structure 28 and its nacelle structure 82 may form an exterior of the aircraft propulsion system 22 and may border the external environment 92.

The guide vane structure 32 may also be open to the external environment 92 forming an open guide vane structure. This guide vane structure 32 of FIG. 7 includes a plurality of open exit guide vanes 192; e.g., airfoils. The guide vanes 192 are arranged and may (or may not) be equispaced circumferentially about the propulsion system axis 38 in an array; e.g., a circular array. This array of the guide vanes 192 may be unshrouded or alternatively shrouded by a tubular guide vane shroud dedicated to the guide vane structure 32 for example. This guide vane structure 32 and its guide vanes 192 are arranged axially next to (e.g., adjacent) the propulsor rotor 64 and its propulsor blades 188. The guide vane structure 32 and its guide vanes 192 of FIG. 7, for example, are arranged downstream of the propulsor rotor 64 and its propulsor blades 188, without (e.g., any) other elements axially therebetween to obstruct, turn and/or otherwise influence the air propelled by the propulsor rotor 64 to the guide vane structure 32. Each of the guide vanes 192 projects radially out from an exterior surface of the inner housing structure 28, into the external environment 92, to a distal tip 194 of the respective guide vane 192. Each guide vane 192 is thereby configured as an un-ducted guide vane which is exposed to (e.g., disposed in) the surrounding external environment 92. With the foregoing arrangement, the guide vane structure 32 and its guide vanes 192 are configured to condition (e.g., straighten out, de-swirl, etc.) an outer stream of air propelled by the propulsor rotor 64 within the external environment 92 that bypass the engine core 50. Of course, in other embodiments, the guide vane structure 32 may be omitted where, for example, the aircraft propulsion system 22 is alternatively configured as a counter-rotating open rotor (CROR) aircraft propulsion system, etc.

Figure 7:
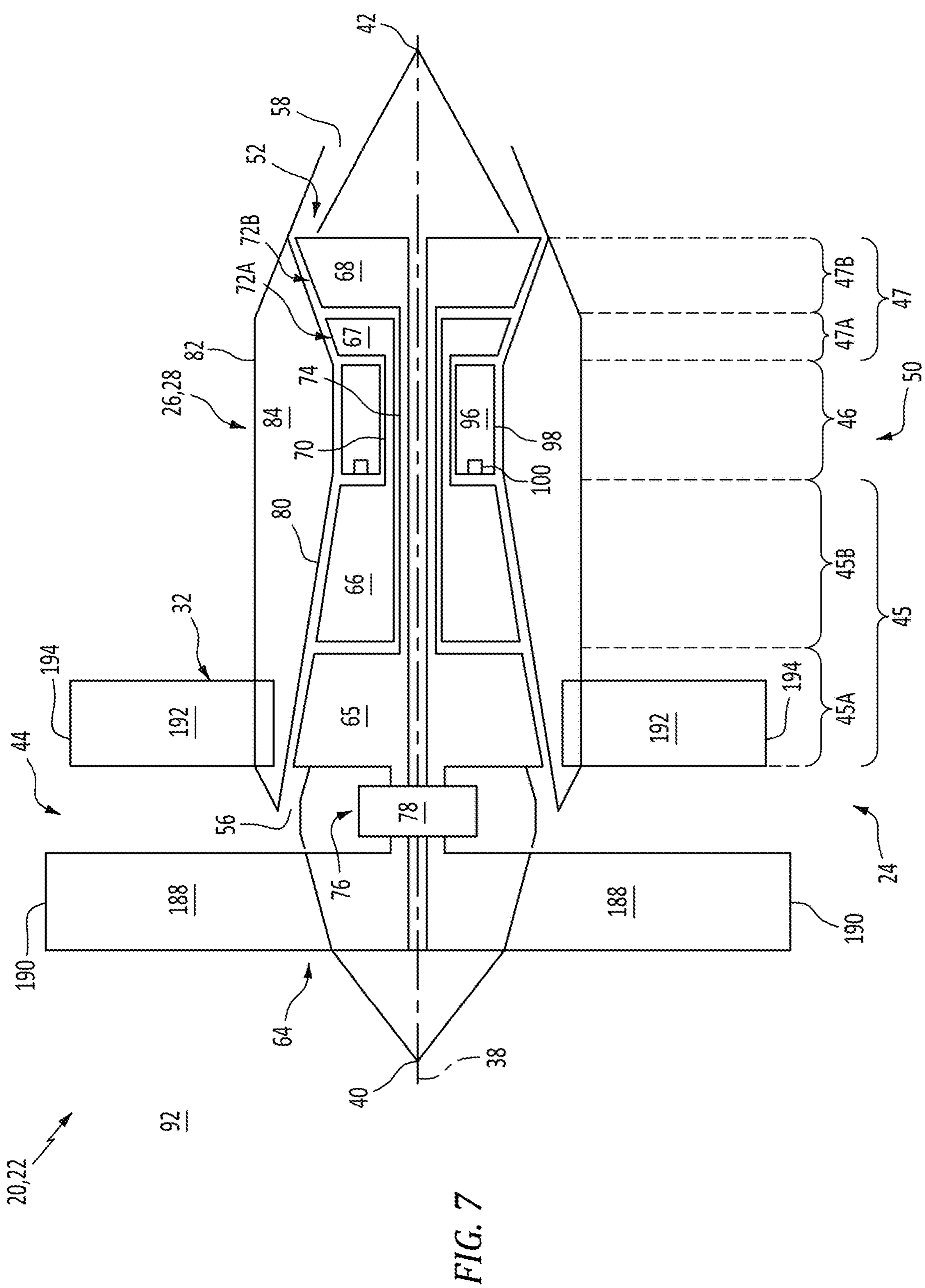
FIG. 7 is a partial schematic illustration of the aircraft propulsion system with an open propulsor rotor.

While the turbine engine 24 in FIG. 1 and FIG. 7 is shown with a particular two rotating structure arrangement, the present disclosure is not limited thereto. For example, the LPC rotor 65 may be omitted to configure the LPT rotor 68 as a power turbine (PT) rotor for the propulsor rotor 64. In another example, the turbine engine 24 may also include another rotating structure; e.g., an intermediate speed spool for the turbine engine 24 and its engine core 50.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:

a first powerplant component;

a second powerplant component;

a third powerplant component;

a fluid system including a first fluid circuit, a second fluid circuit, a third fluid circuit and a heat exchanger, the first fluid circuit extending through the heat exchanger and configured to service the first powerplant component, the second fluid circuit extending through the heat exchanger and configured to service the second powerplant component, the third fluid circuit extending through the heat exchanger and configured to service the third powerplant component, and the heat exchanger comprising a radiator;

wherein the heat exchanger is configured to at least one of
exchange heat energy between a first fluid flowing through the first fluid circuit with a second fluid flowing through the second fluid circuit;
exchange heat energy between the first fluid flowing through the first fluid circuit with a third fluid flowing through the third fluid circuit; or
exchange heat energy between the second fluid flowing through the second fluid circuit with the third fluid flowing through the third fluid circuit;
a first electric machine and a first electric machine controller configured to control operation of the first electric machine, the first powerplant component comprising one of the first electric machine or the first electric machine controller; and
a second electric machine and a second electric machine controller configured to control operation of the second electric machine, the second powerplant component comprising one of the second electric machine or the second electric machine controller.

2. The assembly of claim 1, wherein the first fluid circuit is fluidly independent of the second fluid circuit and the third fluid circuit.

3. The assembly of claim 2, wherein the second fluid circuit is fluidly independent of the third fluid circuit.

4. The assembly of claim 1, wherein at least one of
the first fluid circuit comprises a first flow regulator configured to regulate a flow of the first fluid in the heat exchanger;
the second fluid circuit comprises a second flow regulator configured to regulate a flow of the second fluid in the heat exchanger; or
the third fluid circuit comprises a third flow regulator configured to regulate a flow of the third fluid in the heat exchanger.

5. The assembly of claim 4, wherein at least one of
the first flow regulator is disposed in the heat exchanger where the first fluid circuit comprises the first flow regulator;
the second flow regulator is disposed in the heat exchanger where the second fluid circuit comprises the second flow regulator; or
the third flow regulator is disposed in the heat exchanger where the third fluid circuit comprises the third flow regulator.

6. The assembly of claim 4, wherein at least one of
the first flow regulator is configured to meter the flow of the first fluid in the heat exchanger where the first fluid circuit comprises the first flow regulator;
the second flow regulator is configured to meter the flow of the second fluid in the heat exchanger where the second fluid circuit comprises the second flow regulator; or
the third flow regulator is configured to meter the flow of the third fluid in the heat exchanger where the third fluid circuit comprises the third flow regulator.

7. The assembly of claim 4, wherein at least one of
the first flow regulator is configured to selectively direct the flow of the first fluid into at least one of a first circuit first path or a first circuit second path in the heat exchanger where the first fluid circuit comprises the first flow regulator;
the second flow regulator is configured to selectively direct the flow of the second fluid into at least one of a second circuit first path or a second circuit second path in the heat exchanger where the second fluid circuit comprises the second flow regulator; or
the third flow regulator is configured to selectively direct the flow of the third fluid into at least one of a third circuit first path or a third circuit second path in the heat exchanger where the third fluid circuit comprises the third flow regulator.

8. The assembly of claim 1, wherein the heat exchanger comprises an air passage, and the heat exchanger is configured to at least one of
exchange heat energy between air flowing through the air passage with the first fluid flowing through the first fluid circuit within the heat exchanger;
exchange heat energy between the air flowing through the air passage with the second fluid flowing through the second fluid circuit within the heat exchanger; or
exchange heat energy between the air flowing through the air passage with the third fluid flowing through the third fluid circuit within the heat exchanger.

9. The assembly of claim 1, wherein at least one of
the first fluid circuit is configured to at least one of cool or lubricate the first powerplant component with the first fluid;
the second fluid circuit is configured to at least one of cool or lubricate the second powerplant component with the second fluid; or
the third fluid circuit is configured to at least one of cool or lubricate the third powerplant component with the third fluid.

10. The assembly of claim 1, further comprising:
an engine core comprising a compressor section, a combustor section and a turbine section; and
a flowpath configured to bypass the engine core;
the heat exchanger arranged along a peripheral boundary of the flowpath.

11. The assembly of claim 1, further comprising:
an engine core comprising a compressor section, a combustor section and a turbine section;
a flowpath configured to bypass the engine core; and
an air circuit configured to bleed air from the flowpath and direct the air through and/or along the heat exchanger.

12. The assembly of claim 1, wherein
the heat exchanger comprises a plurality of heat exchange elements;
the first fluid circuit comprises a first circuit channel extending in a first of the plurality of heat exchange elements;
the second fluid circuit comprises a second circuit channel extending in the first of the plurality of heat exchange elements;
the third fluid circuit comprises a third circuit channel extending in the first of the plurality of heat exchange elements; and
the first circuit channel is fluidly independent of the second circuit channel and the third circuit channel within the first of the plurality of heat exchange elements, and the second circuit channel is fluidly independent of the third circuit channel within the first of the plurality of heat exchange elements.

13. The assembly of claim 1, wherein at least one of
the first powerplant component comprises the first electric machine, and the first fluid circuit is further configured to service the first electric machine controller; or
the second powerplant component comprises the second electric machine, and the second fluid circuit is further configured to service the second electric machine controller.

14. The assembly of claim 1, further comprising:
a turbine engine;
the third powerplant component configured as a part of and disposed within an interior of the turbine engine.

15. The assembly of claim 1, wherein at least one of
the first electric machine is configurable as at least one of a first electric motor or a first electric generator; or
the second electric machine is configurable as at least one of a second electric motor or a second electric generator.

16. An assembly for an aircraft powerplant, comprising:
a first powerplant component;
a second powerplant component;
a third powerplant component; and
a fluid system including a first fluid circuit, a second fluid circuit, a third fluid circuit and a heat exchanger, the first fluid circuit extending through the heat exchanger and configured to service the first powerplant component, the second fluid circuit extending through the heat exchanger and configured to service the second powerplant component, the third fluid circuit extending through the heat exchanger and configured to service the third powerplant component, and the heat exchanger comprising a radiator;
a first electric machine and a first electric machine controller configured to control operation of the first electric machine, the first powerplant component comprising one of the first electric machine or the first electric machine controller;
a second electric machine and a second electric machine controller configured to control operation of the second electric machine, the second powerplant component comprising one of the second electric machine or the second electric machine controller;
a compressor section;
a combustor section;
a turbine section;
a flowpath extending through the compressor section, the combustor section and the turbine section;
a first rotating structure comprising a first bladed rotor disposed in the compressor section or the turbine section, the first rotating structure operatively coupled to the first electric machine; and
a second rotating structure rotationally independent of the first rotating structure, the second rotating structure comprising a second bladed rotor disposed in the compressor section or the turbine section, and the second rotating structure operatively coupled to the second electric machine.

17. An assembly for an aircraft powerplant, comprising:
a first electric machine and a first controller configured to control operation of the first electric machine;
a second electric machine and a second controller configured to control operation of the second electric machine;
a powerplant component; and
a fluid system including a first fluid circuit, a second fluid circuit, a third fluid circuit and a heat exchanger, the first fluid circuit extending through the heat exchanger and configured to service at least one of the first electric machine or the first controller, the second fluid circuit extending through the heat exchanger and configured to service at least one of the second electric machine or the second controller, the third fluid circuit extending through the heat exchanger and configured to service the powerplant component, and the heat exchanger comprising a radiator;
the heat exchanger is configured to at least one of
exchange heat energy between a first fluid flowing through the first fluid circuit with a second fluid flowing through the second fluid circuit;
exchange heat energy between the first fluid flowing through the first fluid circuit with a third fluid flowing through the third fluid circuit; or
exchange heat energy between the second fluid flowing through the second fluid circuit with the third fluid flowing through the third fluid circuit.

* * * * *